(12) United States Patent
Fajardo et al.

(10) Patent No.: US 6,652,163 B2
(45) Date of Patent: Nov. 25, 2003

(54) SPLICE JOINT AND PROCESS FOR JOINING A MICROSTRUCTURED OPTICAL FIBER AND A CONVENTIONAL OPTICAL FIBER

(75) Inventors: James C. Fajardo, Painted Post, NY (US); Michael T. Gallagher, Corning, NY (US); Qi Wu, Eaton Town, NJ (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 10/004,375

(22) Filed: Oct. 31, 2001

(65) Prior Publication Data

US 2003/0081915 A1 May 1, 2003

(51) Int. Cl.⁷ .............................................. G02B 6/255
(52) U.S. Cl. ........................................................ 385/96
(58) Field of Search .............................. 385/95–99, 27, 385/28, 125

(56) References Cited

U.S. PATENT DOCUMENTS

| | | | | |
|---|---|---|---|---|
| 5,018,824 A | * | 5/1991 | Ooe et al. | 385/99 |
| 5,384,878 A | * | 1/1995 | Osaka et al. | 385/96 |
| 6,336,749 B1 | * | 1/2002 | O'Toole et al. | 385/96 |
| 6,404,966 B1 | * | 6/2002 | Kawanishi et al. | 385/125 |
| 6,439,782 B1 | * | 8/2002 | Otani et al. | 385/96 |
| 6,467,973 B2 | * | 10/2002 | Takahashi et al. | 385/96 |
| 6,481,903 B1 | * | 11/2002 | Varma et al. | 385/99 |

OTHER PUBLICATIONS

Bennett, et al "Toward practical holey fiber technology: Fabrication, splicing, modeling, and characterization." Sep. 1, 1999, vol. 24, No. 17, Optics Letters.

Birks, et al "Endlessly single–mode photonic crystal fiber" Jul. 1, 1997, vol. 22, No. 13, Optics Letters.

"Leading the next generation . . . " Blazephc Blaze Photonics Technology www..blazephototonics.com 2001.

* cited by examiner

Primary Examiner—Robert H. Kim
Assistant Examiner—Richard Kim
(74) Attorney, Agent, or Firm—Eric M. Smith; James V. Suggs

(57) ABSTRACT

An optical splice joint and splicing process are provided for joining an end portion of a microstructured optical fiber having a microstructure formed from an array of holes, and a conventional optical fiber. The optical splice joint is formed from a fused portion of opposing end portions of the microstructured optical fiber and optical fiber, wherein the microstructured optical fiber is surrounded by a jacket that is at least 1.6 times thicker along its radius than the microstructure, and has a tensile strength of at least 30 Kpsi with an optical loss of less than 0.30 dB, and relatively little shrinkage (i.e., about 30%) of the holes forming the microstructure. The splice joint is formed by aligning end portions of the microstructured optical fiber and the optical fiber, in a fusion splicer, and applying fusion heat to the fiber ends in a two step process with a low current arc that is offset with respect to the end of the microstructured optical fiber.

16 Claims, 8 Drawing Sheets

SPLICE JOINT AND PROCESS FOR JOINING A MICROSTRUCTURED OPTICAL FIBER AND A CONVENTIONAL OPTICAL FIBER

FIELD OF THE INVENTION

This invention generally concerns optical splice joints, and is specifically concerned with a low loss splice joint and process for joining a microstructured optical fiber with a doped silica optical fiber.

BACKGROUND OF THE INVENTION

Microstructured optical fibers are optical waveguide fibers typically formed from silica which contain a periodic array of holes on the scale of the optical wavelengths that propagate along the axis of the fiber. The holes are symmetrically arranged within the fiber to form a light guiding microstructure or core. The resulting microstructure provides an array of air-glass interfaces that guides light along the optical axis of the fiber by total internal reflection. While such fibers are more difficult to fabricate than conventional optical fibers (some are formed by stacking, fusing and drawing a bundle of silica capillary tubes), they have the advantage of being able to transmit a broad range of different optical wavelengths in a single mode along the length of the fiber, thereby minimizing intermodal dispersion-type noise in the transmitted optical signals.

One of the obstacles blocking the practical use of such microstructured fibers is the efficient coupling of light into and out of this type of waveguide. Such coupling is usually implemented by splices that optically and mechanically interconnect a pair of optical fibers. Such splices are typically created by a fusion splicing process wherein an electrical arc is used to fuse together the ends of optical fibers being joined.

Unfortunately, when fusion splicing is used to join a microstructure optical fiber with a conventional optical fiber, the resulting joint causes high losses of 1.5 dB or more in the combined fiber. Such losses are far higher than the losses which occur in a splice joint between two conventional optical fibers, which typically are only about 0.02 dB, which corresponds to about a 0.5% signal loss. To put the loss problem in even greater perspective, the minimum 1.5 dB loss associated with a single microstructured optical fiber splice corresponds to at least a 25% loss in signal.

Clearly, there is a need for a splicing process capable of reliably and consistently creating a splice joint between a microstructured optical fiber and a conventional optical fiber without the excessive losses associated with the prior art. Ideally, the resulting splice would not only have losses considerably less than the 1.5 dB associated with the prior art, but would also have a high degree of mechanical strength for resisting breakage or damage to the fiber when it is installed or modified within an optical network. Finally, it would be desirable if such a low-loss, high strength splice could be created quickly, easily, and inexpensively without the need for specially designed and manufactured fusion splicing machinery.

SUMMARY OF THE INVENTION

The invention is an optical splice joint and method that fulfills all of the aforementioned needs. The splice joint of the invention generally comprises an end portion of a microstructured optical fiber having a light guiding microstructure and a jacket circumscribing the microstructure, an end portion of an optical fiber, and a fused portion joining the end portions of the fibers wherein the optical losses associated with the fused portion is less than 1 dB and preferably less than 0.30 dB. The inventive splice and process stem from the observation by the inventors that the high losses associated with prior art microstructured optical fiber splices were caused by the substantial collapse of the holes in the microstructure during the fusion steps of the splicing process. By contrast, the holes in the microstructure in a splice of the invention are only partially collapsed less than about 50%, and more preferably to only about 35%. This substantial reduction in hole collapse results in far smaller losses than those associated with the prior art.

The diameter of the mode fields of both the microstructured optical fiber and optical fiber are preferably substantially equal, and the fused portion forming the splice joint has a tensile strength of at least 30 Kpsi and more preferably a tensile strength equal to or greater than 50 Kpsi.

To prevent collapse of the microstructure during the fusing steps of the splicing process, the radial width of the jacket of the microstructured optical fiber is at least 1.6 times the radial width of the microstructure and more preferably about twice such radial width. The optical fiber is preferably a doped silica fiber, and more preferably a 2% high delta fiber, as the mode field diameter of such fibers is about the same size as the mode field diameter of a microstructured fiber (i.e., about 6 $\mu$m).

In the process of the invention, an end portion of a microstructured fiber and an optical fiber are first aligned in opposing relationship in a fusion splicer, with the end of the microstructured fiber offset along the axis of the fibers between about 75 and 120 $\mu$m from the center of the arc produced by the splicer such that the regular fiber is an extra 75 to 120 $\mu$m over the arc. Such offsetting prevents the microstructure in the fiber end from being exposed to excessive heat. An arc is then generated from the electrically operated fusion splicer with a current of between 8 and 12 mA for a time period of between about 0.2 and 0.4 seconds, and the opposing end portions are then moved into contact. After about 0.3 seconds, the contacting end portions are then exposed to the arc for an additional time period of between about 0.3 and 0.7 seconds. The relatively thick outer jacket of the microstructured optical fiber, in combination with the offset positioning of the microstructured optical fiber end and the low current two-stage heating process prevents substantial hole collapse in the microstructure, and results in a splice that is characterized by a loss of less than 0.65 dB and more typically about 0.20 dB along with a high tensile strength.

DETAILED DESCRIPTION OF THE INVENTION

Figure 1:
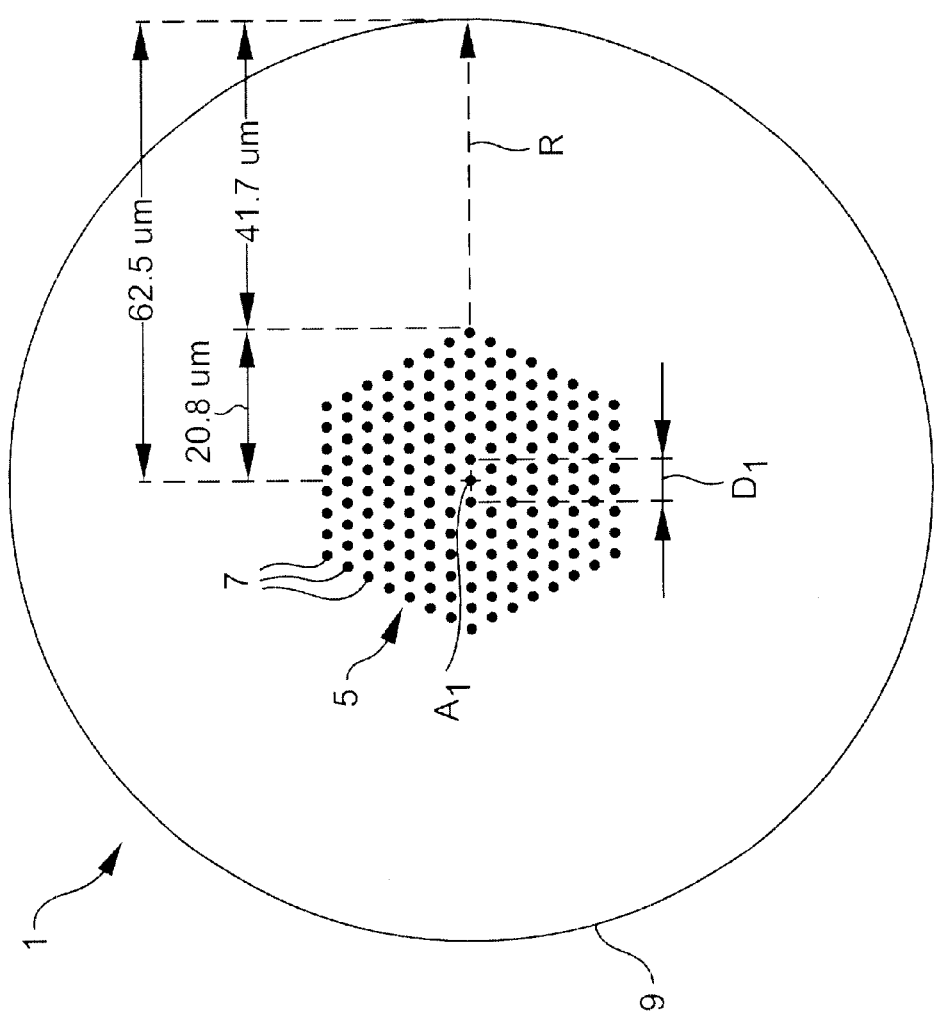
FIG. 1 is a cross-sectional side view of a microstructured optical fiber having a centrally-disposed microstructure surrounded by a fiber jacket.
Figure 2:
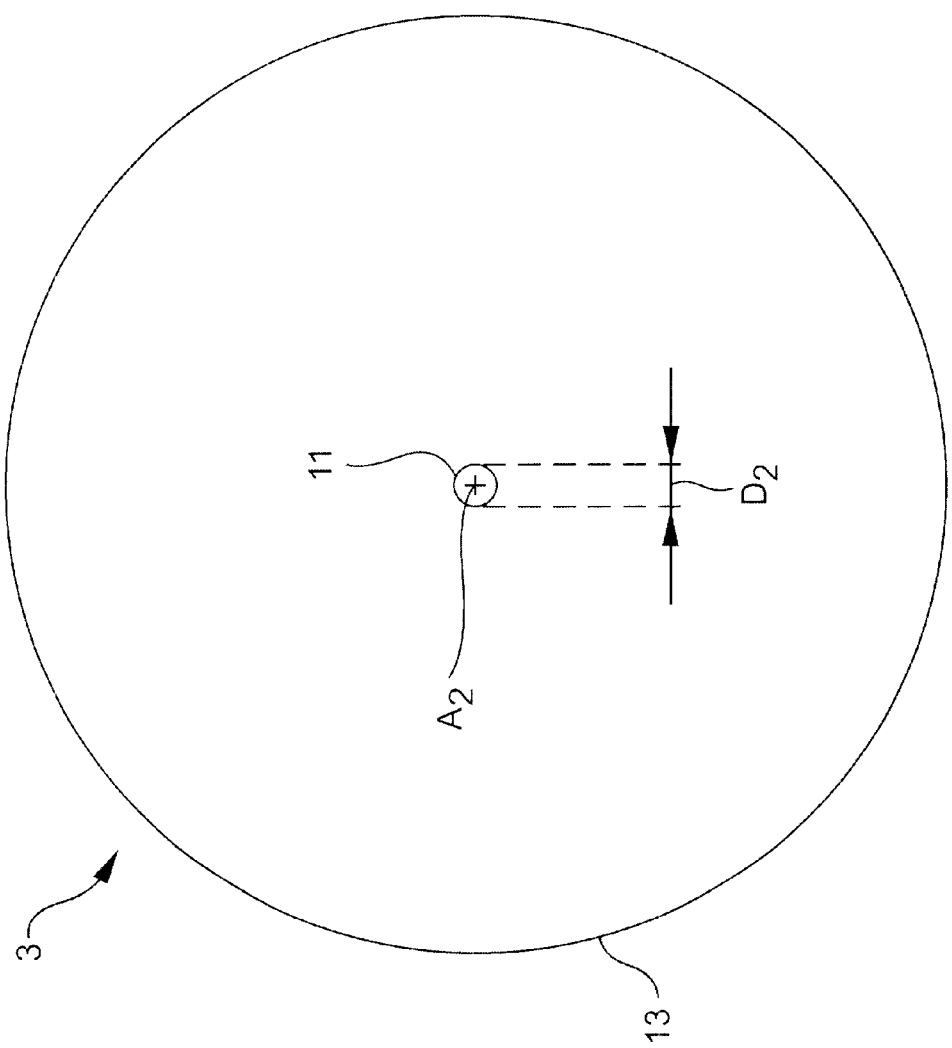
FIG. 2 is a cross-sectional side view of an optical fiber having a core (indicated in phantom) that generally defines a mode field diameter.

With reference now to FIGS. 1 and 2, wherein like numerals designate like components throughout all of the several Figures, the invention is both a splice and a process for joining a photonic crystal fiber 1 with a conventional optical fiber 3. The microstructured optical fiber 1 includes a microstructure 5 formed from a plurality of holes 7 in the glass forming the fiber 1. The holes 7 are parallel to the central optical axis A1 of the fiber 1, and provide a plurality of silica/air interfaces that perform a light-guiding function via total internal reflection when the fiber 1 is in use. The microstructure 5 is surrounded by an annular jacket 9 which, in this example, is integrally formed from the same silica forming the microstructure. In the preferred embodiment, the radial width of the jacket is at least 1.6 times the radial with of the microstructure, and is more preferably about 2.0 times this radial width. In the example illustrated in FIG. 1, the radial width of the microstructured optical fiber 1 is 62.5 $\mu$m, with the microstructure 5 having a radial width of about 20.8 $\mu$m, while the jacket 9 has a radial width of 41.7 $\mu$m. Thus, in the example illustrated in FIG. 1, the radial width of the jacket is slightly more than 2.0 times the radial width of the microstructure 5. As will become more evident hereinafter, such proportioning between the microstructure 5 and jacket 9 is important, as it helps to prevent a substantial collapse of the holes 7 forming the microstructure 5 when the splice joint of the invention is formed.

With specific reference to FIG. 2, the optical fiber 3 that the microstructured optical fiber 1 is joined to includes a core 11 surrounded by cladding 13. Both the core 11 and cladding 13 are integrally formed from silica, the difference being that the core 11 has a higher index of refraction than the surrounding cladding 13. Such a difference in the index of refraction is usually accomplished by the provision of a higher concentration of dopant atoms, such as germanium, into the core 11. In the preferred embodiment, the optical fiber 3 has a mode field diameter D2 which is somewhat larger than the diameter of the core 11 and is the same as the diameter of the mode field diameter D1 of the microstructured optical fiber 1. Since the mode field diameter D1 of the microstructured optical fiber is approximately 6 $\mu$m at the wavelength 1550 nm, the optical fiber 3 used in the preferred embodiment is a 2% high delta optical fiber, since such fibers typically also have a mode field diameter of approximately 6 $\mu$m at the wavelength 1550 nm. While the invention encompasses splice joints and a splicing process wherein the mode field diameter of the optical fiber 3 is somewhat different from the mode field diameter D1 of the microstructured optical fiber 1, such an embodiment is not preferred since the geometrical mismatching of the mode field diameters will result in undesirable losses in the final splice joint.

Because the mode field diameter of a 2% high delta fiber is significantly less than the mode field diameter of commonly used optical fibers such as SMF-28® single mode optical fiber manufactured by Corning, Incorporated, of Corning, N.Y., there is a need for an economical and efficient way to splice together optical fibers having relatively small mode field diameters (i.e., on the order of 6 $\mu$m) with more commonly used fibers such as SMF-28® single mode optical fiber having larger mode field diameters (i.e., on the order of about 10 $\mu$M). Fortunately, this problem has already been solved in a patent application entitled "An Optical Fiber Having an Expanded Mode Field Diameter and Method for Expanding the Mode Field Diameter," invented by Qui Wu, PCT Serial No. US99/21828 assigned to Corning, Incorporated. This patent application has been published under International Publication No. WO 00/19256. This application provides a complete description as to how a bridging fiber might be fabricated that has an expanding mode field diameter between 6 $\mu$m at one end, and 10 $\mu$m on the other end which might be used to efficiently splice couple a segment of high delta 2% fiber to SMF-28® single mode optical fiber.

FIGS. 3A–3D illustrate the process and the resulting splice joint of the invention. In the first step of the process illustrated in FIG. 3A, an end portion 15 of a microstructured optical fiber 1 is placed in opposition to an end portion 17 of the optical fiber 3 within a commercially available fusion splicer 18. The splicer 18, may be, for example, a commercially available fusion splicer, such as, for example a Model No. FSU-975 fusion splicer manufactured by Ericsson Cable AB, available from Amherst FiberOptics of Brentwood, Tenn. It is important that the optical axes A1 and A2 (shown in FIGS. 1 and 2) are collinear during this alignment step so that the mode field diameters of the fibers are precisely aligned. As is shown throughout FIGS. 3A–3D, the fusion splicer 18 includes a pair of opposing, pointed electrodes 19a, b. It is further important during the initial alignment step illustrated in FIG. 3A that the end 15 of the microstructured optical fiber 1 be displaced a distance d1 away from the center line C defined between the points of these electrodes 19a, b. In the preferred embodiment of the process of the invention, the distance d1 ranges between about 25 to 300 $\mu$m and is preferably 100 $\mu$m. Prior to the application of an arc from the electrodes 19a, b a carbon coating 21 is applied to the end 15 of the microstructured optical fiber 1 as shown. This coating 21 is grounded in order to facilitate the application of an arc to the end portion 15.

Figure 3A:
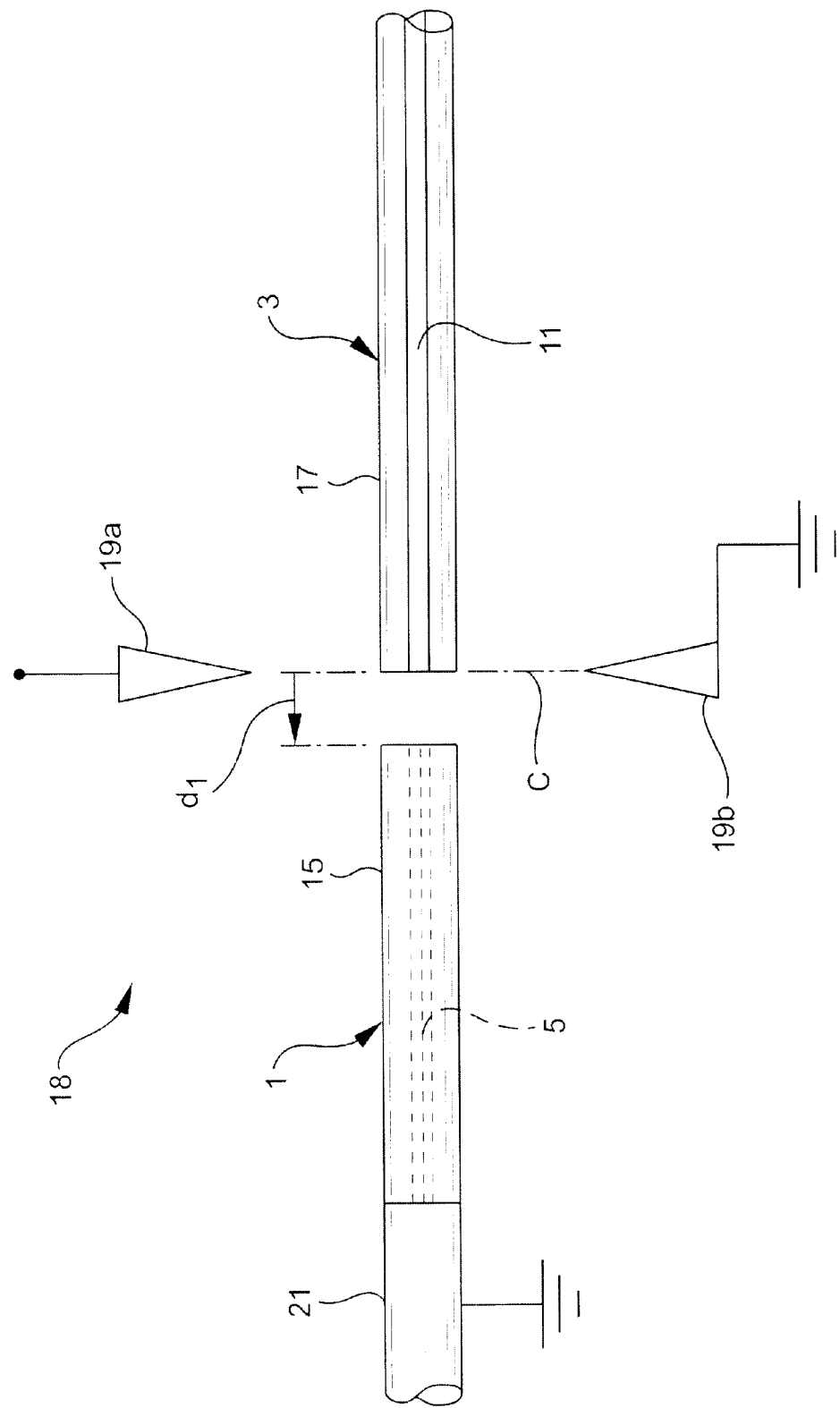
FIG. 3A illustrates a first step in the process of the invention, wherein end portions of the microstructured optical fiber illustrated in FIG. 1 (and shown on the right-hand side) and the optical fiber illustrated in FIG. 2 (and shown on the left-hand side) are aligned in opposing relationship within an electrically operated fusion splicer.
Figure 3B:
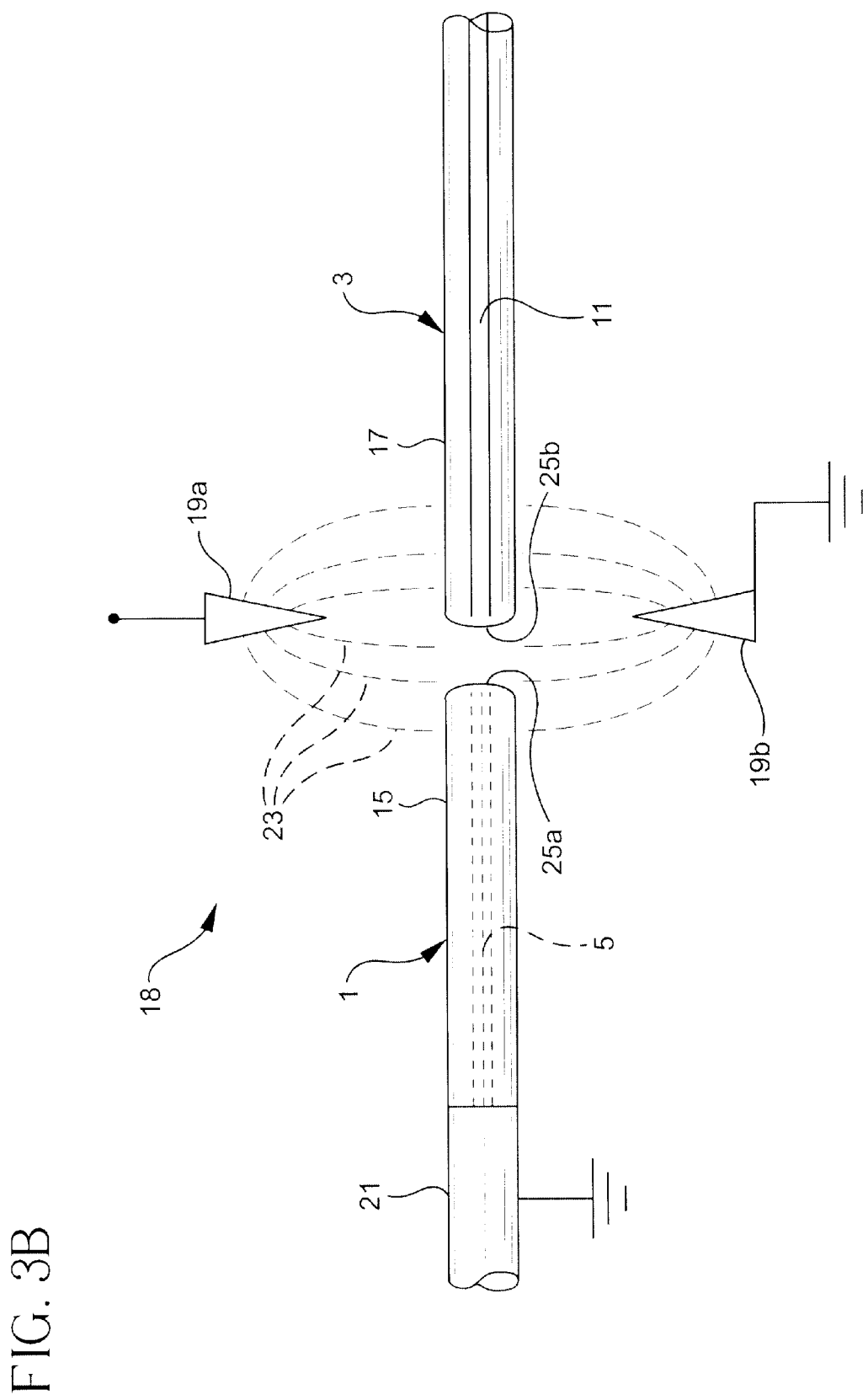
FIG. 3B illustrates a second step of the process wherein an arc generated by the fusion splicer fuses the ends of the microstructured optical fiber and the optical fiber.

In the second step of the splicing process illustrated in FIG. 3B, the fusion splicer 18 is actuated to generate an arc 23 to create fused end portions 25a, b. In the preferred implementation of this process step, the arc is generated from a current of between about 8 and 12 mA, and most preferably about 10 mA. Moreover, the ends 25a, b of the fibers 1 and 3 are exposed to the resulting arc 23 for a time period of between about 0.2 and 0.4 seconds, and most preferably 0.3 seconds. The offset displacement of the end 25a of the microstructured optical fiber 1 the previously described distance d1 prevents the hottest portion of the arc 23 from contacting the end 25a. This is an important aspect of the invention, as such indirect contact with the arc 23 advantageously prevents excessive shrinkage of the holes 7 forming the microstructure 5.

Figure 3C:
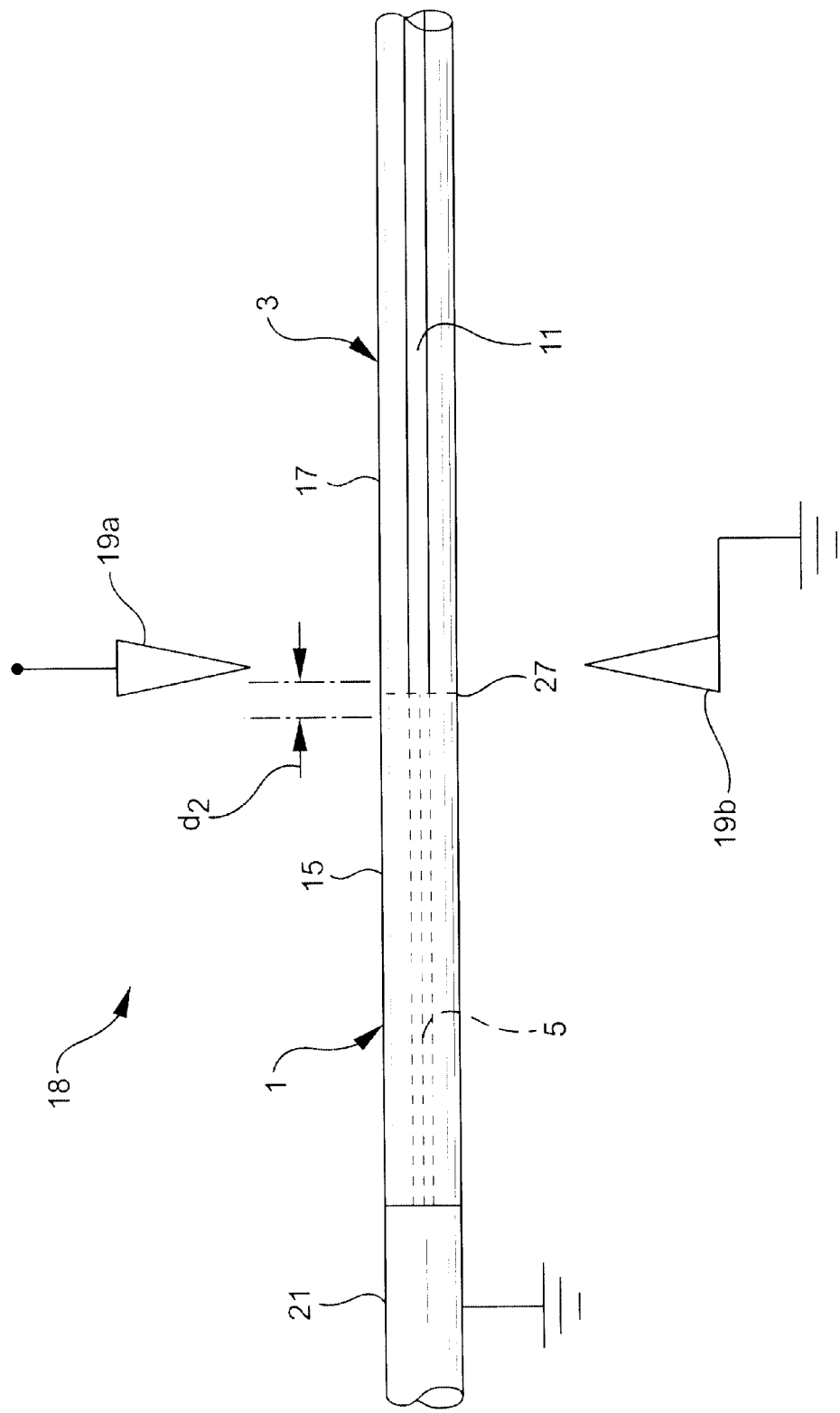
FIG. 3C illustrates a third step of the inventive process wherein the fused end portions of the fibers are moved into contact with one another to form a splice.

The third step of the process is illustrated in FIG. 3C. Here, the fusion splicer 18 is deactivated, and the two ends 25a, b of the fibers 1, 3 are moved together into contact to form splice joint 27. In this step, the ends 25a, b are moved into contact for a distance d2 of between about 6 and 10 $\mu$m, and most preferably about 8 μm. Such a "overlapping" contact is possible since the ends 25a, b of the fibers 1, 3 are in a plastic state immediately after the second processing step.

Figure 3D:
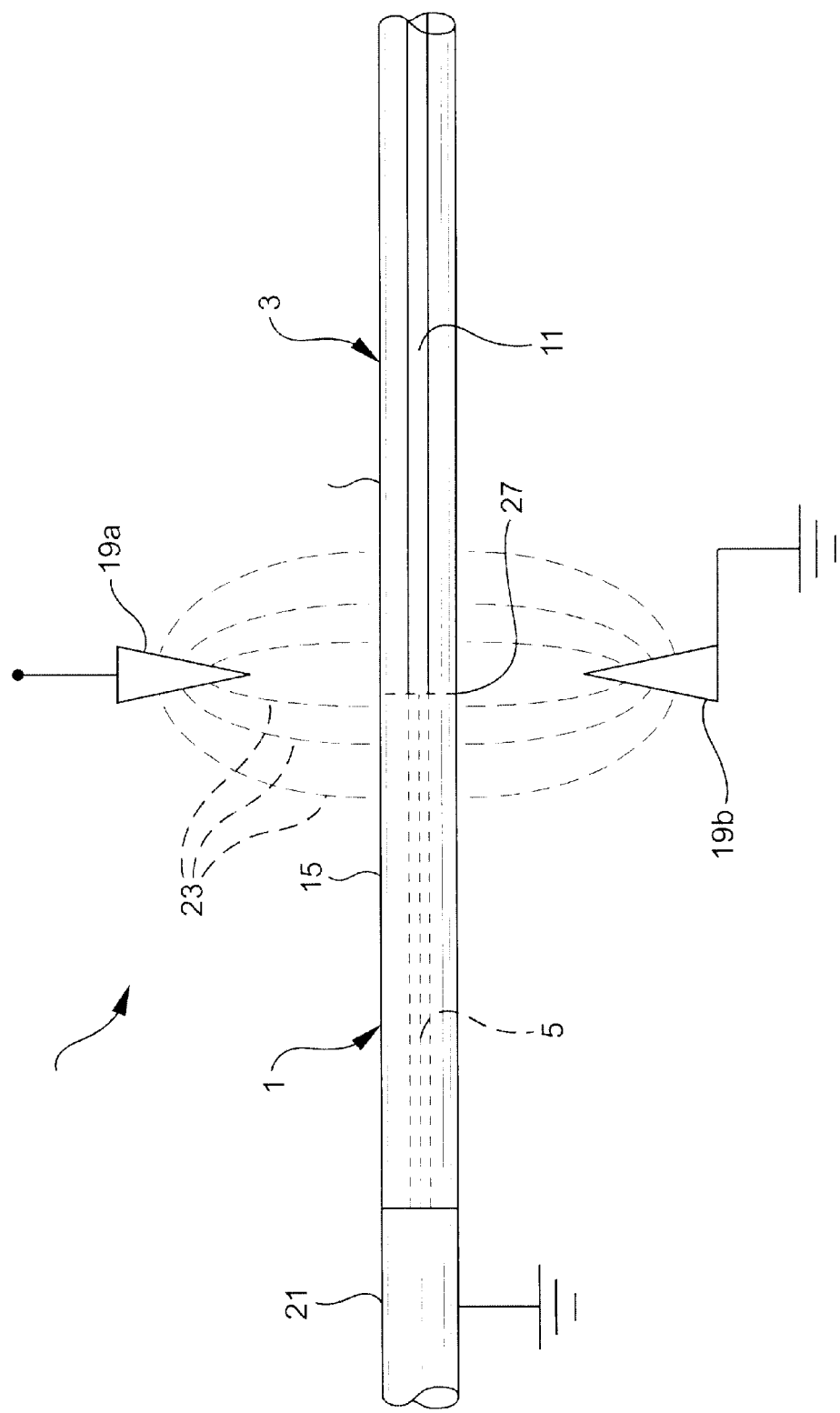
FIG. 3D illustrates a fourth step of the inventive process wherein additional heat is applied to the splice joint by the arc of the fusion splicer.

The fourth step of the splicing process is illustrated in FIG. 3D. Here, between about 0.2 and 0.5 seconds after the two ends 25a, b are brought into contact to form the splice 27, the fusion splicer 18 is reactivated with the same amount of current described with respect to the second process step, but for a somewhat longer fusion time of between about 0.4 and about 0.6 seconds, and most preferably for about 0.5 seconds. The additional heating insures the production of a strong splice, particularly between the jacket 9 of the microstructured optical fiber 1, and the cladding 13 of the optical fiber 3.

Figure 4:
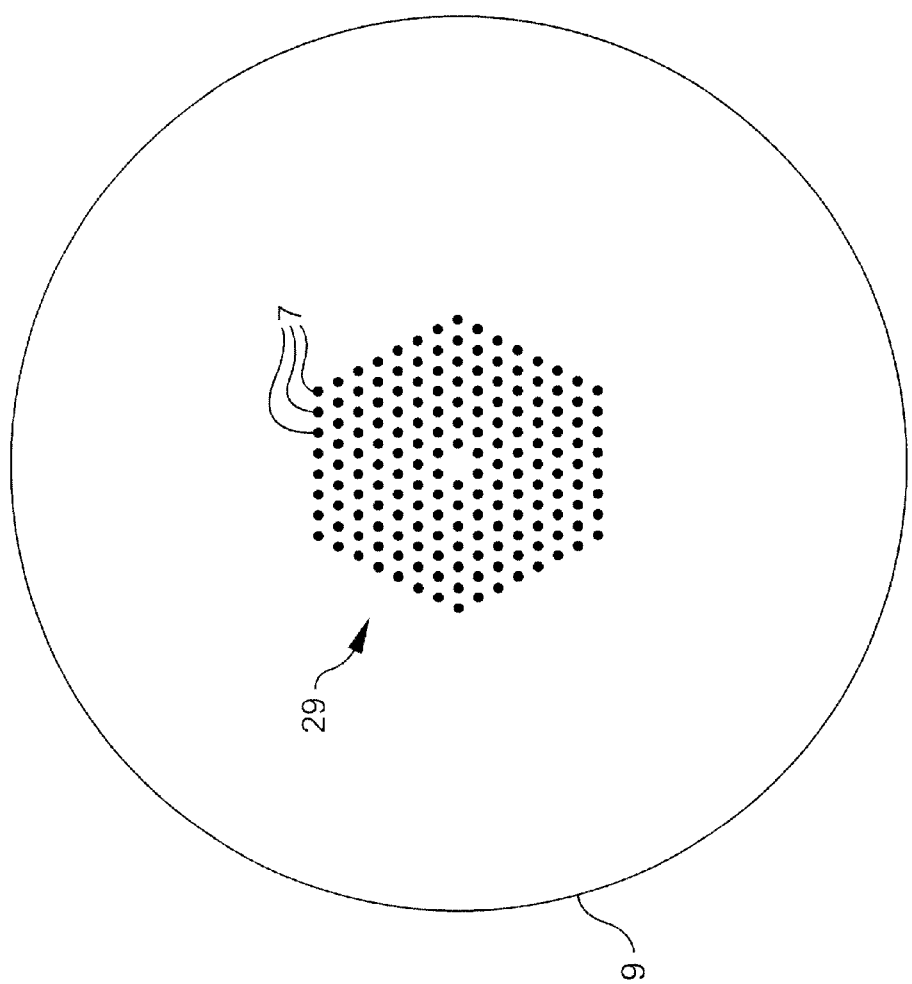
FIG. 4 is a cross-sectional side view of a post-spliced end portion of a microstructured optical fiber, illustrating how the heat of fusion creates only a modest shrinkage of the holes forming the microstructure.

FIG. 4 illustrates the amount of hole collapse or shrinkage that typically occurs in the microstructure 29 of a microstructured optical fiber 1 at the splice joint 27. While there is some shrinkage as a result of the initial fusion step described with respect to FIG. 2B, the areas of the holes 7 forming the microstructure are reduced by only about 30% from their initial cross-sectional areas. The applicants believe that the relatively small amount of collapsing of the holes 7 results from the offsetting of the end 15 of the microstructured optical fiber 1 with respect to the arc generated by the fusion splicer 18 during the initial fusion step, the use of relatively small amounts of current for short amounts of time in a two-stage application of fusion heat, and the selection of a microstructured optical fiber having an outer jacket of sufficient thickness to insulate the microstructure 6 from excessive heat during the fusion steps.

Figure 5:
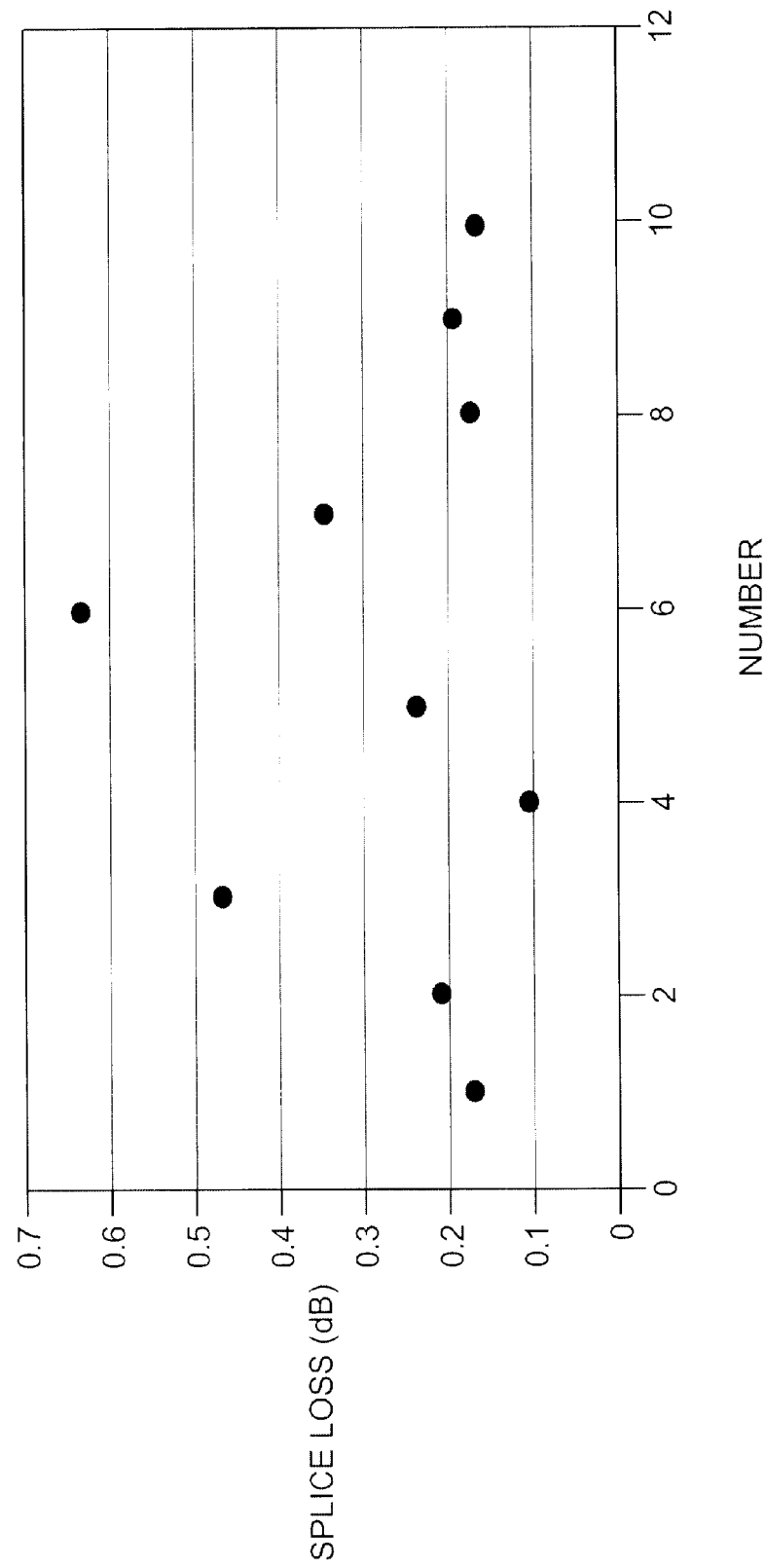
FIG. 5 is a graph illustrating the optical losses associated with each of ten sample splices formed by the process of the invention.

FIG. 5 illustrates sample optical losses, in decibels, attributable to ten different splice joints 27 fabricated in accordance with the process of the invention. As is evident from the graph, these losses range between 0.63 dB and 0.10 dB. Considering the fact that prior splices had losses of 1.5 dB corresponding to a signal loss of about 25% and that the decibel scale is logarithmic, the invention results in a truly dramatic improvement. The highest loss among the sample splices of 0.63 dB corresponds to a loss of only about 10%, while the lowest loss of 0.10 dB corresponds to only about a 1% signal loss, which is comparable to the losses associated with splices between conventional optical fibers. Thus an improvement of between 250% and 2500% is realized.

While this invention has been described with respect to preferred embodiments, various additions, modifications, and variations of the invention will become evident to persons of ordinary skill in the art. All such additions, modifications, and variations are intended to be encompassed within the scope of this patent, which is limited only by the claims of appended hereto.

PARTS LIST

1. Microstructured optical fiber
3. Conventional optical fiber
5. Microstructure
7. Holes
9. Jacket
11. Core
13. Cladding
15. End portion (of microstructured optical fiber)
17. End portion (of optical fiber)
18. Fusion splicer
19. Electrodes a, b
21. Carbon coating
23. Arc
25. Fused end portions a, b
27. Splice
29. Post-fusion microstructure

What is claimed is:

1. An optical splice joint, comprising:
    an end portion of a microstructured optical fiber having a mode field disposed within a light guiding microstructure disposed around an optical axis, and a jacket circumscribing said microstructure;
    an end portion of an optical fiber having a mode field disposed around an optical axis wherein a diameter of said mode fields of said microstructured optical fiber and said optical fiber are substantially equal; and
    a fused portion of said end portions joining said fibers, wherein an optical loss through said fused portion is less than 1 dB, and
    wherein said microstructure of said microstructured optical fiber includes at least one hole disposed parallel with said optical axis, and wherein a cross section of said hole is reduced less than 50% in a vicinity of said fused portion.

2. The optical splice joint of claim 1, wherein said optical loss is less than 0.30 dB.

3. The optical splice joint of claim 1, wherein said optical loss is less than 0.09 dB.

4. The optical splice joint of claim 1, wherein said fused portion of silica has a tensile strength of at least 30 Kpsi.

5. The optical splice joint of claim 4, wherein said tensile strength of said fused portion is equal to or greater than 50 Kpsi.

6. The optical splice joint of claim 4, wherein said microstructure of said microstructured optical fiber includes at least one hole disposed coincident with said optical axis, and wherein a cross section of said hole is reduced less than 50% in a vicinity of said fused portion.

7. The optical splice joint of claim 1, wherein said light guiding microstructure includes a plurality of holes, and wherein a cross section of said plurality of holes is reduced less than 50% on average in a vicinity of said fused portion.

8. The optical splice joint of claim 7, wherein a cross section of said plurality of holes is reduced less than 35% on average in a vicinity of said fused portion.

9. The optical splice joint of claim 1, wherein a radial width of said jacket is at least 1.6 times a radial width of said microstructure.

10. The optical splice joint of claim 1, wherein a radial width of said jacket is at least about twice as much as a radial width of said microstructure.

11. The optical splice joint of claim 1, wherein said doped silica optical fiber has an opposing end portion having a mode field with a diameter that is substantially the same as the mode field of a second optical fiber.

12. The optical splice joint of claim 1, wherein said doped silica fiber is a 2% high delta fiber.

13. The optical splice joint of claim 1, wherein the optical splice joint is made by a process comprising the steps of
    aligning said end portions in opposing relationship;
    generating an arc from an electrically operated fusion splicer with a current of between about 8 and 12 mA;
    exposing said end portions to said arc for between about 0.2 and 0.4 seconds; and
    moving said opposing end portions into contact.

14. The optical splice joint of claim 13, wherein the process further comprises the step of exposing said contacted end portions to said arc for an additional time period of between about 0.3 and 0.7 seconds.

15. The optical splice joint of claim 13, wherein a center of the arc is offset from said aligned end portions by a distance of between about 25 and 300 μm.

16. An optical splice joint, comprising:

an end portion of a microstructured optical fiber having a mode field disposed within a light guiding microstructure disposed around an optical axis, and a jacket circumscribing said microstructure;

an end portion of a 2% high delta optical fiber having a mode field disposed around an optical axis wherein a diameter of said mode fields of said microstructured optical fiber and said optical fiber are substantially equal; and a fused portion of said end portions joining said fibers, wherein an optical loss through said fused portion is less than 1 dB.

* * * * *